United States Patent [19]

Klumpp et al.

[11] Patent Number: 4,472,750

[45] Date of Patent: Sep. 18, 1984

[54] DATA RECORD WITH PRE-RECORDED TRANSDUCER POSITIONING SIGNALS, AND SYSTEM FOR UTILIZING SAME

[75] Inventors: Marlin K. Klumpp, Ann Arbor; Joseph H. Mueller, Tecumseh; Francis Lum; Samuel N. Irwin, both of Ann Arbor, all of Mich.

[73] Assignee: Irwin Magnetic Systems, Inc., Ann Arbor, Mich.

[21] Appl. No.: 280,138

[22] Filed: Jul. 2, 1981

[51] Int. Cl.³ .................. G11B 21/08; G11B 21/10
[52] U.S. Cl. ........................... 360/78; 360/77
[58] Field of Search .............. 360/78, 77, 75, 135, 360/69, 70, 71, 72, 95, 97, 98; 318/561, 571

[56] References Cited

U.S. PATENT DOCUMENTS

| | | | |
|---|---|---|---|
| 4,103,314 | 7/1978 | Case | 360/77 |
| 4,285,015 | 8/1981 | Rose | 360/77 |
| 4,297,734 | 10/1981 | Laishley | 360/78 |
| 4,297,737 | 10/1981 | Andresen | 360/77 |
| 4,310,861 | 1/1982 | Kashio | 360/78 |
| 4,352,131 | 9/1982 | Van Herk | 360/78 |

*Primary Examiner*—Robert Martin Kilgore
*Attorney, Agent, or Firm*—Price, Heneveld, Huizenga & Cooper

[57] ABSTRACT

A recording member for digital data, particularly a recording tape, has a plurality of generally parallel, closely-spaced recording tracks which each contain pre-recorded track-identifying and transducer-positioning servo information, as well as defined data-recording areas. The pre-recorded track-identifying information preferably comprises a digitally-encoded individual track address, and the servo information comprises separate bursts used in centering the transducer upon a particular track. Preferably, each such track has a dedicated area at its beginning, end, or both, which contain continuous repetitions of such positioning information, there being no data areas in such dedicated portions. Digital encoding of track addresses utilizes binary-type code format, accomplished by defining a binary "zero" as a recorded burst present at a first number of sampling points, and defining a binary "one" as a burst present at a second number of sampling points of a second duration. The pre-recorded positioning information includes certain non-recorded "gaps" which serve as initializing signals, and the preferred system for utilizing the pre-recorded, servo-controlled record member utilizes peak-detection and minimum-threshold techniques to accurately distinguish unrecorded gaps from noise, or the like, on the one hand, and to distinguish coded signal bursts from other possible recorded signals, or noise, on the other hand. The preferred system is entirely self-clocking, i.e., the record member does not carry a recorded clock track, and thus does not require the additional transducer required where recorded clock tracks are used; at the same time, the area on the record member otherwise occupied by the clock track is available for data-recording usage.

58 Claims, 8 Drawing Figures

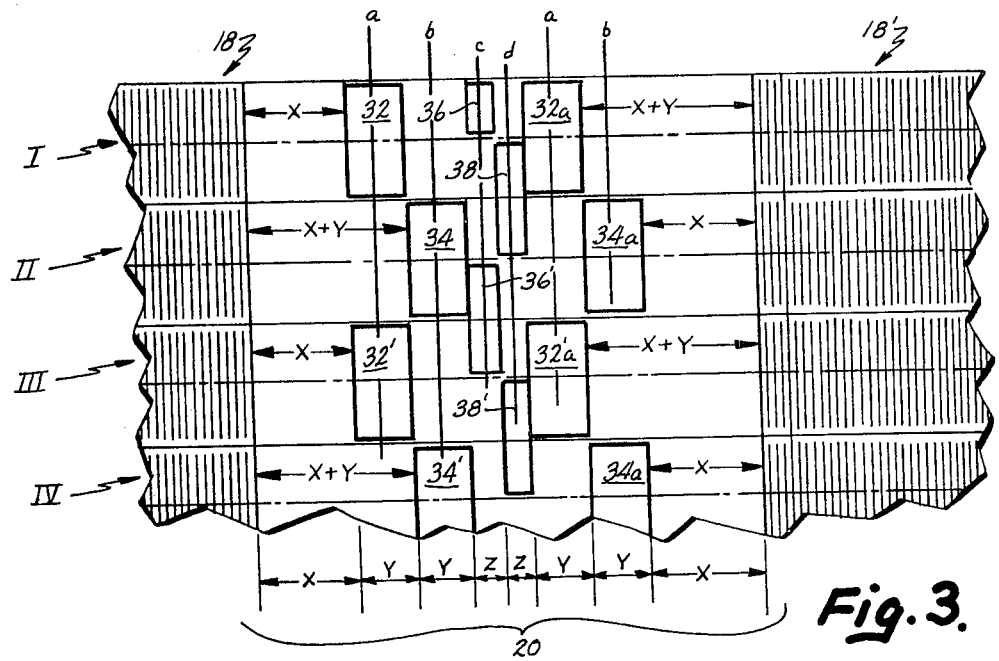
Fig. 3.
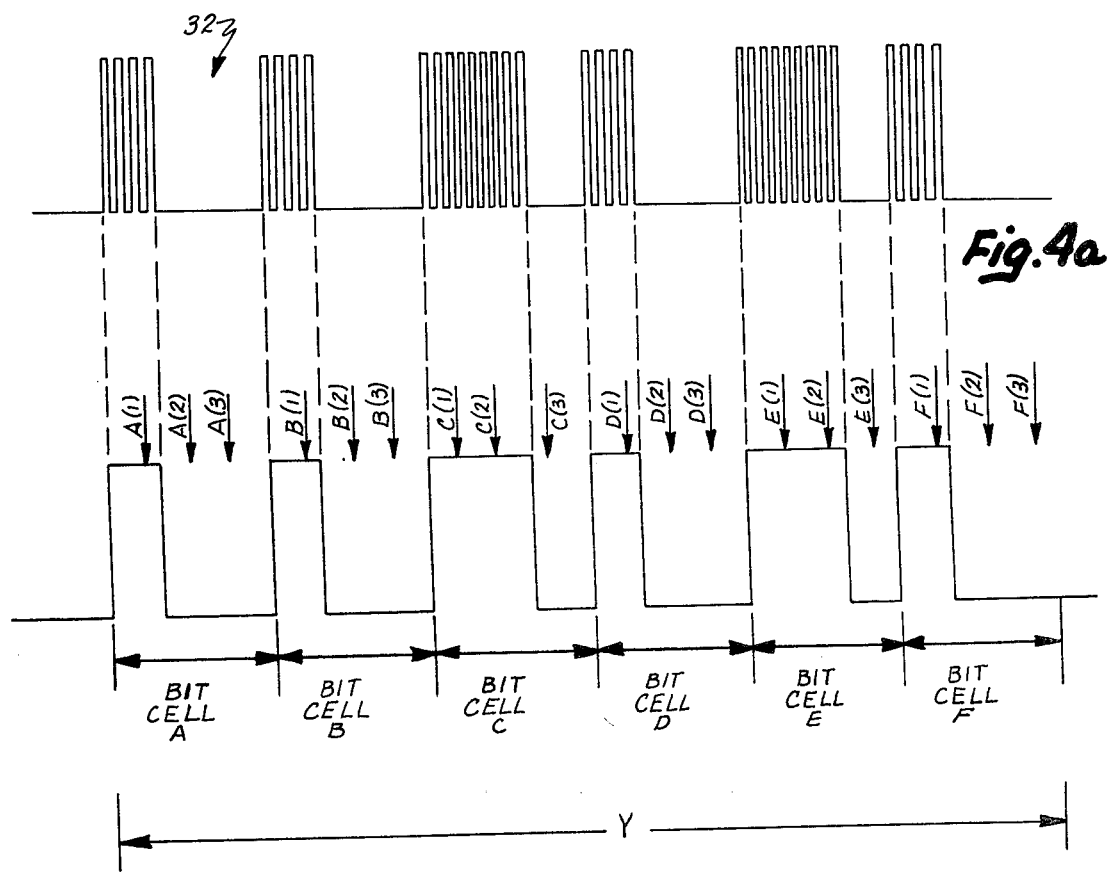
Fig. 4a.
Fig. 4b.

4,472,750

DATA RECORD WITH PRE-RECORDED TRANSDUCER POSITIONING SIGNALS, AND SYSTEM FOR UTILIZING SAME

BACKGROUND OF THE INVENTION

The present invention relates generally to data-recording media, i.e., records, and to record track-following and identifying techniques. More particularly, it relates to improved track-identification patterns and to improved systems for utilizing such patterns, both in track-identification and track-following, and in the recording of data in designated areas along such tracks.

More particularly still, in its most preferred form the invention relates to recording tape for use in data-recording systems, having pre-recorded track-identifying and track-following servo information recorded thereon, together with the preferred systems for utilizing such pre-recorded tape-form record members. In broader aspects of the invention, however, the encoding and decoding techniques for track identification, and the improved record format involved, are also applicable to other forms of record member or media, including discs.

In the use and continued development of data recorders, particularly magnetic recorders, substantial effort and progress continues toward the goal of increasing the amount of data for a unit amount of surface area on the recording media. This involves not only increased bit-packing densities, but also involves substantial increases in the number of data tracks per given area, i.e., the tracks themselves being narrowed, and also being placed closer together.

In the past, the higher range of track densities have been found primarily in the use area of disc-type recorders, first in large-capacity rigid or "hard" discs, and more recently in some flexible disc applications. While magnetic recording tape has long been used as a data storage medium, a high density multiple-track data storage tape is rarely or never encountered, particularly in business office-type user applications, even though possessing rather substantial potential advantages and benefits. The present invention provides such multiple-track recording tape, together with systems and methods for utilizing the same, in which the multiple data tracks are characterized by the presence of "embedded servo" tracking information, preferably in dedicated areas located near the ends of the tape, as well as at locations disposed along the length of the tape, interspersed with or disposed between data-recording regions.

In achieving high track densities in the use of disc-form media, it has heretofore become known that the recording tracks were rarely perfectly concentric with one another and circular in shape; consequently, when the tracks are very narrow and very closely spaced to one another it becomes necessary to servo-position the transducer, and to employ closed-loop techniques, so that the transducer follows the particular motion of the disc, actually following the motion of the tracks recorded on the disc.

In the case of recording tape, the conditions incident to high track densities and lateral tape "wander," as well as other irregularities of motion or non-stabilities, have not heretofore been substantially appreciated or well-understood. It is found, however, that recorded tape exhibits its own pecularities of motion as it is transported lengthwise past a transducer, as a result of the seeming impossibility of guiding the tape so continuously and so completely as to maintain this motion in an essentially perfect laterally-fixed position. Of course, recording tape is typically under tension as it is transported lengthwise, and the tape itself is subject to a certain amount of stretching, the amount of which varies as a result of the wide variations in drive forces applied during these conditions. Further, lateral excursions of comparatively large magnitude both parallel to and perpendicular to the transducer may also occur, especially during stopping and starting conditions, as well as during steady-state longitudinal transport. Because of the somewhat random occurrence and presence of such conditions, the non-uniformity of lateral movements of the tape itself, and of recording tracks on the tape, becomes an increasingly important factor as track density increases. Thus, with increased track density, it becomes desirable, and indeed necessary, to servo-control the transducer, moving the same laterally with respect to the tape as the tape is transported longitudinally adjacent the transducer, such that the transducer in effect follows the tracks recorded on the tape even though they may move in a more or less continuous manner with respect to a fixed reference as the tape passes the transducer, or head.

Thus, while there are certainly some general similarities or analogous points involved in magnetic recording on discs as compared to tapes, there are fundamental differences which to a considerable degree isolate the two different activities from one another. That is not only true with respect to the types and natures of the inaccuracies or irregularities of motion, but is also true with respect to conditions for servoing the respective recording media. For example, in the case of disc recorders, it has long been an accepted practice to use at least one track, and frequently either additional tracks or one entire side of a disc (in a multi-disc environment) exclusively for permanently-recorded clock and servoing information or signals. In such situations, a completely separate transducer head is also utilized, being dedicated to clocking and/or servoing activities, and not used for other purposes such as data recording or replay. Since most recording tape is relatively narrow, where multi-track arrangements are desired it is antithetical, and undesirable, to dedicate an entire track or area for permanent use as a source of servo or clock signals. Of course, the provision of a dedicated transducer head for such purposes is also undesirable from the standpoint of economics, at least, and the use of such a head also may present strictures or difficulties from a packaging or placement standpoint, particularly in the case of tape, which is narrow in width and which has most of its length in an unaccessible position, i.e., wound upon reels of one type or another. Consequently, other approaches become highly desirable, if not mandatory, consistent with the particular conditions presented by the nature of recording tape and its environment.

In considering the general development of record track-identification and following systems, generally as an adjunct of high track densities and narrow track widths, prior developments which have taken place in disc-recording technology are to some extent helpful; however, as pointed out above, the inherent nature of tape-recording techniques, of the tape media itself, and of particular conditions mandated thereby, combine to present their own particular problems. For example, recording tape often commences motion from a rest position, which may either be at one end of the tape or somewhere between the ends thereof; furthermore, tape drive motion may in many instances be bi-directional, or various bands or tracks on the tape may be intended for a first direction of motion, whereas other bands or tracks are intended for the opposite direction of motion. Thus, "embedded servo" techniques developed for use in disc applications may well not be applicable, or may raise quite different problems if applied.

SUMMARY OF THE INVENTION

The present invention provides novel and advantageous servo record format techniques which are especially advantageous for use in multiple-track, high-density tape recording applications, particularly magnetic tape; in its broader applications, however, the novel servo-recording formats are also useful in other media types, including for example, recording discs.

The present invention additionally provides a novel and advantageous track-identification encoding technique, which makes use of binary-type, digital addresses for each different track, which is integrated with servo-positioning records, which provides for high reliability in code pattern recognition and decoding reliability, with resultant highly reliable track identification.

Additionally, the present invention provides novel and highly useful detection and decoding techniques which increase the system reliability while also maximizing the available number of recording tracks, and at the same time, providing desirable system design and manufacturing economies.

Some of the more particular objectives, advantages and features of the invention are: to provide a highly effective embedded servo record member, and system, for use in tape-type devices, while at the same time having broader applicability and usefulness in other forms of recording technology; to provide digitally-encoded individual track addresses as part of the pre-recorded positioning patterns, and to integrate such recorded track addresses with track-centering servo information; to provide for a novel track-identification and track-following record format making use of erased gaps, i.e., signal absences, as significant record-detection and timing features; to provide for the use, in such a system, of only a single transducer for track-seeking, for track identification, for track-following, and for data recording and reproducing purposes, i.e., totally dispensing with the need for, and use of, a separate, dedicated clock track, as well as a separate, dedicated servo track, together with elimination of the concomitant feature of a separate, dedicated transducer such as is typically employed where separate clock tracks and/or separate servo information tracks are utilized.

Additional features of the invention are the provision of highly advantageous threshold-detecting and/or peak-detecting concepts, used both to verify the presence of various code pattern features, as well as to process transduced code signals; the provision of non-aligned and non-registering track-positioning (i.e., track-identification and track-following) signal records on a lateral track-to-track basis; the provision of a track-positioning system which provides for self-clocking not only of servo-positioning records but also of data information records, and for the updating or re-synchronizing of such clocking on a record-by-record basis; and, the provision of a formatted, multiple track record member having designated beginning and/or ending portions of the various tracks which are dedicated to, and contain substantially only, track-identifying and track-following record signals, appearing on a generally continuously repetitive basis.

The foregoing features, advantages and objectives of the invention will become more apparent and will be better understood by consideration of the ensuing specification and its appended claims, particularly in view of the accompanying drawings.

BRIEF DESCRIPTION OF THE DRAWINGS

FIG. 3 is an enlarged, fragmentary view showing a medial portion of the record member of the preceding figures, showing a single positioning information record, interspersed between data records;

FIG. 4(a) is a pictorialized signal wave form diagram illustrating track identification address encoding techniques, and FIG. 4(b) is an envelope representation of the wave form of FIG. 4(a), further illustrating decoding techniques;

DETAILED DESCRIPTION OF THE PREFERRED EMBODIMENT

Figure 1:
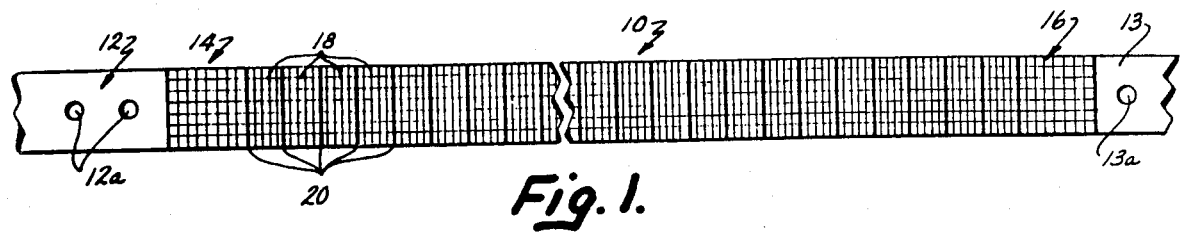
FIG. 1 is a fragmentary, pictorial view of one example of a record member in accordance herewith illustrating the general placement of the positioning information recorded thereon.

Referring now in more detail to the drawings, FIG. 1 depicts a servo-tracking data record member 10 in accordance with the invention, which in the most preferred form is magnetic tape, in particular, relatively narrow tape of the type typically provided in cartridges or cassettes; for example, "one-eighth" inch tape, which is actually 150 mils. wide. Such a record member may, in accordance herewith, carry a plurality of generally parallel recording tracks, indicated generally in FIG. 1 as horizontally-extending spaces delineated by lightly-drawn horizontal lines. More particularly, seven such separate tracks are illustrated herein (FIG. 2), although a larger number than that could actually be implemented on eighth-inch tape by practicing the invention. Thus, the tracking difficulties caused by vertical tape wander during end-to-end transport will be readily apparent.

The record member 10 as depicted in FIG. 1 generally includes leader-type end portions 12 and 13, typically of non-recordable character, and typically carrying punched holes or the like 12a, 13a, which serve as beginning-of-tape ("BOT") and end-of-tape ("EOT") indicia, respectively, conventionally detected by optical means. In accordance with the invention, the record member 10 is formatted to have dedicated or restricted areas 14 and 16 at the beginning and end of the tape, respectively, which are devoted exclusively to the presence of pre-recorded tracking information, explained further hereinafter. Additionally, the record 10 includes a large plurality of record fields 18 which may be considered to be segregated or demarked from one another by recorded indicia, i.e., recorded signal patterns or conditions, appearing in blocks designated by the numeral 20, described more fully hereinafter.

Figure 2:
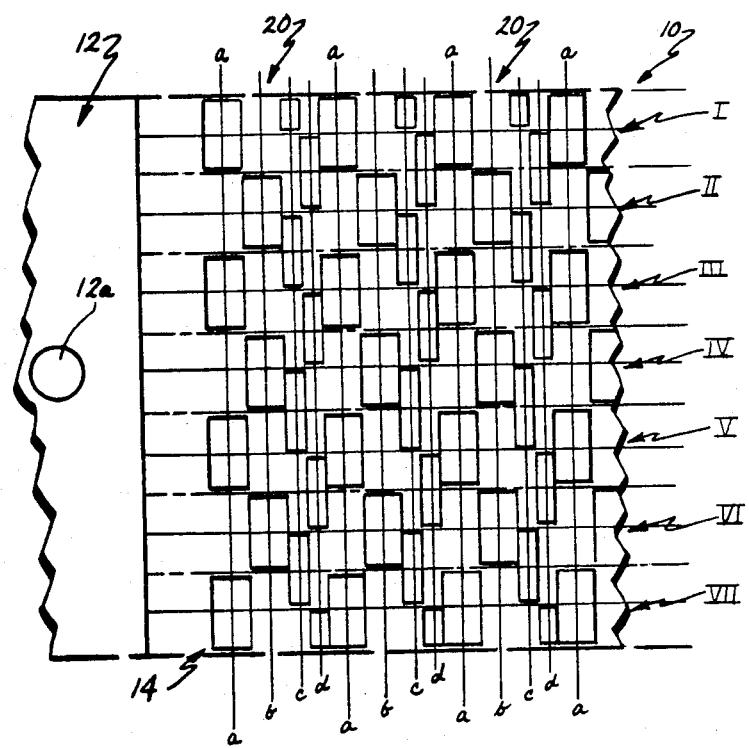
FIG. 2 is an enlarged, fragmentary view showing a portion of one of the dedicated end areas of the record member of FIG. 1 and indicating the general placement and format of the recorded tracking information contained in such areas.

The dedicated area 14 of the record member 10, mentioned briefly above, is shown in more detail in FIG. 2, wherein the different recording tracks are designated I–VII, inclusive. As schematically illustrated in FIG. 2, each individual such track in area 14 (as in area 16) has a repetitive pattern of the signal blocks 20, each of which may for purposes of illustration be subdivided by the vertical indicia or ordinates a, b, c and d. Further, the odd-numbered tracks I, III, V, and VII are essentially identical, as are the even-numbered tracks II, IV and VI. While the odd-numbered tracks are similar to the even-numbered ones, they are organized somewhat differently, as discussed hereinafter, and it will be observed that the recorded blocks in the odd-numbered tracks are not in lateral registration (i.e., not aligned along the ordinates a–d) with the analogous blocks in the even-numbered tracks.

As already indicated, the major portion of the record member 10 is formatted to have repetitive, alternating record fields 18 which are set apart from one another by what have been referred to as recorded indicia blocks 20; in fact, the latter comprise what may be referred to as "servo burst," fields or "positioning records," which include an encoded track-identification address and servo-positioning tracking signals, or blocks of signals. This general format is illustrated schematically in FIG. 3, in which successive data record fields 18, 18' are shown in a representative way to include a large number of closely-spaced signal transitions, which may for example be on the order of eight kilobytes, typically including not only user data per se but also such things as field markers, headers, error check codes, etc. It is contemplated that the various record fields 18, 18' are written in modified FM (MFM) according to conventional data-writing techniques. The servo fields 20 are another matter, however, and the preferred format for these is illustrated in FIG. 3.

As shown in FIG. 3, interspersed between each of the various record fields 18, 18', in which the user's data is recorded, are the aforementioned "servo burst" fields 20. In fact, each such servo burst field 20 includes several distinct signal records, in particular, an encoded track-identifying header block 32 (odd-numbered tracks) or 34 (even-numbered tracks), followed (as viewed from left to right) by first and second servo-positioning bursts 36, 38. The header blocks 32, 34 are centered upon the centerline of each of their respective recording tracks, but the servo-positioning bursts extend in opposite directions with respect to such centerlines and are disposed in immediately-sequential relationship along the track, i.e., one immediately following the other along their track.

More particularly, it should be noted first that whereas in the illustrated embodiment each of the data fields 18 in each adjacent track terminates at the same point along the tape, on a track-to-track basis, such lateral registration is not in a strict sense an absolute requirement of the present recording pattern and system. The depicted coterminous arrangement does, however, serve to illustrate a likely or even preferred pattern or arrangement, and helps to illustrate certain characteristics of the servo burst blocks. Concerning the latter, it will be noted that certain particular erased gaps (i.e., non-recorded segments) are located at the end of the user's data blocks 18, i.e., at the start of each of the servo blocks 20. More particularly still, one type of such a gap, designated "x," appears in the odd-numbered tracks between the end of data fields 18 and the header blocks 32. A different and longer erased (i.e., unrecorded) gap exists between the end of the user's data blocks 18 and the even-numbered tracks and the position of the first header blocks 32 to the right in those tracks. The length of this second type of gap equals the length of gap "x" plus the length "y" of header 32; thus, the second such gap has a length of x plus y. In accordance with a preferred embodiment of the invention, representative such tape lengths, in terms of time (neglecting speed variations), are: gap $x=4$ milliseconds, duration y (which is the length of the header blocks 32, 34)$=2.2$ milliseconds, and duration z (which is the length of the track-following servo bursts 36 and 38)$=1$ millisecond. These relative durations are approximated in a proportional sense by the corresponding blocks depicted in servo burst 20 in FIG. 3.

With further reference to FIG. 3, it will be noted that in the odd-numbered tracks, such as tracks I and III, a second track-identification header 32(a) appears to the right of the second servo burst 38, leaving an unrecorded gap of a duration x plus y between the end of header 32(a) and the block of user's data 18' immediately to the right. In the even-numbered tracks, a second header block 34(a) is also present within each servo burst area 20, and is located to the right of the second track-positioning servo burst 38, but at a distance therefrom corresponding to gap y. Thus, between the right-hand edge of each header block 34(a) in the even-numbered tracks and the next block of user's data 18' to the right, there is an unrecorded gap of a duration x.

It will thus be seen that the "positioning information" components (i.e., both the track-identification and the track-following signal blocks) in the servo block 20 of the odd-numbered tracks are all similarly positioned, and the counterpart information, or recorded signals, in each of the even-numbered tracks is analogously, but differently, positioned; i.e., the recorded signal blocks in the odd- and even-numbered tracks are in a sense complementary, but they have specifically differing locations. In the first place, the header blocks 32 and 34 are not laterally aligned on a track-to-track basis, but instead follow one another successively from the standpoint of track length. Thus, the odd-numbered tracks have a gap x between the end of the user's data blocks and the first header block 32, whereas in the case of the even-numbered tracks, there is a gap of length x plus y in that position; conversely, after the last (second) header block 32(a) in the odd-numbered tracks and the next ensuing block of user's data 18', there is a gap of a duration x plus y, whereas in the analogous position in the even-numbered tracks there is a gap of only duration x. It may thus be seen that the recorded signal pattern in the servo burst 20 in odd-numbered tracks takes the following form, from the standpoint of duration: an unrecorded or erased gap x, a header burst of duration y, an unrecorded gap of duration y, a positioning burst of one polarity for a duration z, a second positioning burst of the opposite polarity for a duration z, a second header for a duration y, and an unrecorded gap of a duration x plus y. In the even-numbered tracks, the burst-gap pattern is the reverse. This basic pattern or format may be used as a preliminary or overall synchronization pattern, to provide a check which insures that a given pattern of signals transduced from a given record track is, in fact, a servo burst block 20, i.e., failure of the synchronization pattern at any point along its length resulting in microprocessor-controlled reinitialization of the servo loop and circuitry.

An exemplary track-identification header 32 occurring over the duration y is illustrated in more detail in FIGS. 4(a) and 4(b), the basic nature of which generally characterizes any of the header blocks 32 or 34 (or, as explained more fully herebelow, the header blocks 32[a] and 34[a]). As illustrated in FIG. 4, the period or duration y (in the specific example given above defined as having a duration of 2.2 milliseconds) is in effect subdivided to form six bit cells A–F inclusive (each thus having a duration of 370 microseconds). During each such bit cell, a burst of uniform-frequency signal is recorded (for example, square waves at a frequency such as 100 kHz). The duration of these bursts, or their presence at successive sampling points, in accordance herewith, determines whether the bit cell has a logic value of a binary zero or a binary one. More particularly, in accordance herewith, the detected headers 32, 34 are sampled or detected, a number of successive times (preferably at regular intervals commencing asynchronously) during specified divisions (for example each one-third) of each total bit cell duration. Representation of typical sample points are shown individually, for purposes of illustration, in FIG. 4(b) by the arrows A(1), A(2), A(3), B(1), B(2), B(3) etc., each of which may be understood to represent a spaced grouping of different distinct samples occurring during that bit cell. As explained more fully hereinafter, the preferred sampling technique is to employ peak-detecting means and to selectively enable such means a desired number of times at regular intervals during accurately-timed bit cells, by microprocessor control.

However particularly accomplished, the sampling or detecting process will be seen to produce a resultant binary-type coded signal grouping. With reference to the signal pattern depicted in FIG. 4(a), and sampling or detecting at various points as aforementioned, if a binary zero is the value ascribed to a signal-present condition existing at a first detection point (for example, A[1]), but absent at the next two ensuing points (A[2] and A[3]), such as is true of bit cells A, B, D and F, and ascribing a binary one value to the situation where signal presence is detected at both of the first two such sampling points, but not at the third such point, as is true for example in bit cell C and bit cell E, the resulting encoded address for the header 32 depicted in FIG. 4 would be 001010. In each case, the third sampling area is used as a code-verifying means, the presence of a signal burst during that sampling area indicating a false or non-authentic code signal, and thus not an operative header.

Of course, the particular address header duration y utilized in a given system may be made to correspond to the particularities of that system, insofar as requisite number of binary bits, etc. In accordance herewith, however, using an odd-even pattern format corresponding to odd-numbered and even-numbered tracks, as described above, it may be desirable to dedicate certain bit cells to an indication of whether an odd track or an even track is being received. This may be accomplished, for example, by use of a particular one of the bit cells, for example bit cell A, encoding the same to have, for example, the binary zero illustrated in FIG. 4 as an indication of an odd-numbered track, a binary one being used to indicate an even-numbered track. Alternatively, this information may be obtained directly from the track identification code, since inevitably an identified specific track will be known to be odd or even, as the case may be. It is further useful to indicate the relative position of the particular bit cell being read with respect to the general arrangement of the entire track, i.e., whether or not that bit cell, and thus the position of the tape with respect to the head at that instant, is at one of the dedicated portions 14 or 16 at the ends of the recording track, or one of the medial positions somewhere between these two areas. This may be accomplished by the encoding of a second bit cell, or the first and second bits may both be utilized for this purpose, to provide for greater detection assurance or parity check purposes.

In accordance with the preceding, it will be seen that the header-recording format thus embodies an encoding technique which provides for digital track-addressing, of a binary code form. That is, not only may certain bit cells be designated to carry general information, (e.g., odd or even track, as aforementioned), but a group of bit cells may similarly be designated to carry a binary address for the particular track being transduced. In the example given in FIG. 4, if the first two bit cells are dedicated for generalized positioning information in the manner set forth above, four bit cells remain for a binary address for the particular track then being transduced. Of course, additional bit cells could be provided for in the headers by which, for example, an address could be similarly encoded for the particular position along the recording track, for example, the particular sector, which information is highly useful, and perhaps essential, in the case of very lengthy record tracks. In such a case, all or any desired part of the entire header format may, from the standpoint of signal or gap sequencing, be used as a synchronization pattern, to augment system accuracy, and in fact the entire encoded header, or a desired portion thereof, may be repeated or presented in complement form for synchronized or recognition purposes.

The servo burst format illustrated in FIG. 3 is deemed particularly advantageous in the case of tape-form record members, as contemplated hereby. More particularly, in a multi-track tape-form record member, end-to-end, back-and-forth data recording and reproduction is highly advantageous. Thus, a two-gap transducer head which is positioned with one gap in alignment with an odd-numbered track and the other in alignment with an even-numbered track, e.g., tracks I and IV, may transduce from the first such track with its upper gap while the tape is first transported from left to right, and when the tape reaches the end, the transducer may simply remain in its position and have its other channel enabled to read or write on track IV of the tape as it is transported in the opposite direction.

In such a system, the header encoding for headers 32 and 34 may be accomplished in a left-to-right sequence, whereas the encoding of headers 32(a) and 34(a) may be in a right-to-left, or reverse, sequence. That is, while a sequence of logic zeros and ones will indeed identify a given particular track, the logic sequence will be different depending upon whether it is being read from the left or from the right, and it may at times happen that the enabled transducer gap is aligned over a track then being moved in the "wrong" direction. Thus, if an "erase" (i.e., unrecorded) gap of x plus y duration is the first thing encountered or "read," the transducer could either be positioned over an odd-numbered track with the tape being transported from right to left, or it could be positioned over an even-numbered track with the tape being transported from left to right, the mere occurrence of a verified six-bit address header not in and of itself necessarily indicating actually meaningful information. If the address headers positioned at what should be the end of the servo burst block, (i.e., headers 32[a] or 34, in a back-and-forth or alternating track-recording sequence) are encoded in reverse format, the track address which they embody will be properly "read" and "understood" by the system, and the actual direction of record member motion may thus be accommodated and/or verified.

The servo-positioning bursts 36 and 38 are, in accordance herewith, contemplated as being bursts of uniform-frequency signals, of approximately the relative duration indicated previously (i.e., on the order of one millisecond) and generally depicted in FIG. 3. As seen there, each such servo-positioning burst is disposed over one-half of two adjacent tracks (except, of course, for the edge tracks such as that designated track I). Thus, servo burst 38, for example, will be "read" by a transducer centered on track I and also read by a transducer centered on track II, and the same is true of a servo-positioning burst such as burst 38', which is shared between tracks III and IV. Similarly, servo-positioning bursts such as 36' are shared between tracks II and III. Compared to the duration of each individually-detected bit cell in the headers, it will be appreciated that the continuous servo-positioning bursts are of long duration, i.e., approximately three times the length of each header bit cell. This not only provides for virtually certain detection of one from the other, but also provides for considerable certainty in the accurate detection of the particular amplitude transduced from each servo burst, during positioning, as described subsequently.

The track-identifying headers 32, 34, unlike the servo bursts 36, 38, are each centered upon their own respective recording tracks, and are not shared between, or read by, a transducer centered upon the adjacent track. Also, it will be noted that while the header records are approximately a full track width wide, they are not aligned laterally from track to track, but are instead offset from one another with respect to the track length. Thus, a transducer located between tracks I and II, for example, will first read the lower half of header 32 and then the upper half of header 34, thus maintaining the integrity, and understandability, of the digitally-encoded track identification embodied by each respective header. That is, binary-encoded track address bits from two separate tracks will not be read at the same time, or during the same time period.

The servo-positioning bursts 36, 38, being comprised of single-frequency and single-amplitude signals, thus constitute amplitude-type transducer-positioning embedded servo information, detection and use of which may be utilized to center a transducer upon a selected track, and to maintain the transducer in such a centered relationship, generally through known amplitude-comparison techniques. That is to say, a transducer generally aligned with track I, for example, will (after encountering erased gap x and track-identifying header 32) first encounter servo burst 36 and then encounter servo burst 38. If the transducer is at that time more nearly aligned with burst 36 than it is with burst 38, a difference in amplitude will be detected, and that difference may be utilized to generate an error signal which, by closed-loop servoing techniques, may be used to move the transducer an indicated amount in an indicated direction to bring it more nearly onto the track center, directly between the two servo bursts.

In accordance with the foregoing, it will be seen that the servo burst area 20 is encoded so that (where the odd-numbered tracks are read from left to right, and the even-numbered tracks are read from right to left) a transducer head following generally along a recording track will first encounter an erased or unrecorded gap of duration x, will then encounter a digitally-encoded track-identifying header of duration y, will then encounter an erased gap of duration y, will then encounter a servo burst of duration z which is representative of positioning in the direction corresponding to the upper portion of the recording track (as depicted in FIG. 3), will then immediately encounter a second servo burst of duration z representative of positioning in the direction corresponding to the lower half of the recording track, and will then immediately encounter a reversely-encoded track-identification header of duration y. Following that, the next thing to be encountered is an unrecorded gap of duration x plus y, followed by the next ensuring block of user's data 18', which would, of course, be recorded left to right in the odd-numbered tracks and right to left in the even-numbered tracks.

Referring once again to FIGS. 1 and 2, and particularly to the dedicated areas 14 and 16 at the beginning and end of the record member (or at least the beginning or end, or at a designated position along the length of, particular record tracks), as indicated previously, such dedicated areas preferably comprise continuously-repeating servo burst blocks of the type generally designated by the numeral 20 in FIG. 3. The feature of a dedicated area 14 or 16 is particularly advantageous in the case of a record member 10 comprising recording tape, especially where the intended or most frequently-expectable mode of use is where the tape begins motion at one end; most typically, running in a continuous motion until the other end is reached, although intermittent motion during medial portions of the tape is also a possible procedure.

In either event, a dedicated area 14 of the beginning of the record member or record tracks helps insure that upon start-up of motion, or of recording or reproducing activities, the particular track upon which the transducer is then most closely centered may be identified with complete certainty, and a desired or selected track may be located and centered upon, prior to the point where the transducer encounters the user data fields 18. After that time, the interspersed singular track-positioning fields 20 may be relied upon to maintain the transducer centered upon the identified track. Particularly where the record member 10 is in the form of tape, however, upon start-up of motion it is desirable to have more than one (or a very small number) of the positioning fields 20 for the desired degree of certainty in initial track-seeking and track-following operations. Accordingly, in accordance with a preferred embodiment of the invention, each of the dedicated areas 14 and 16 may comprise a relatively lengthy portion of record track, for example, on the order of as much space as might contain, say, 100,000 bits of user data as written in its customary format, and even more preferably, from three to five times that amount. With respect to the showing contained in FIG. 2, it should be noted that such showing is to some degree merely illustrative, since while generally an accurate representation, the same lacks some of the detail set forth in FIG. 3. Thus, it should be understood that each of the blocks of positioning information 20 generally depicted in FIG. 2 does in fact comprise one of the servo burst blocks 20 illustrated more particularly in FIG. 3.

Figure 5:
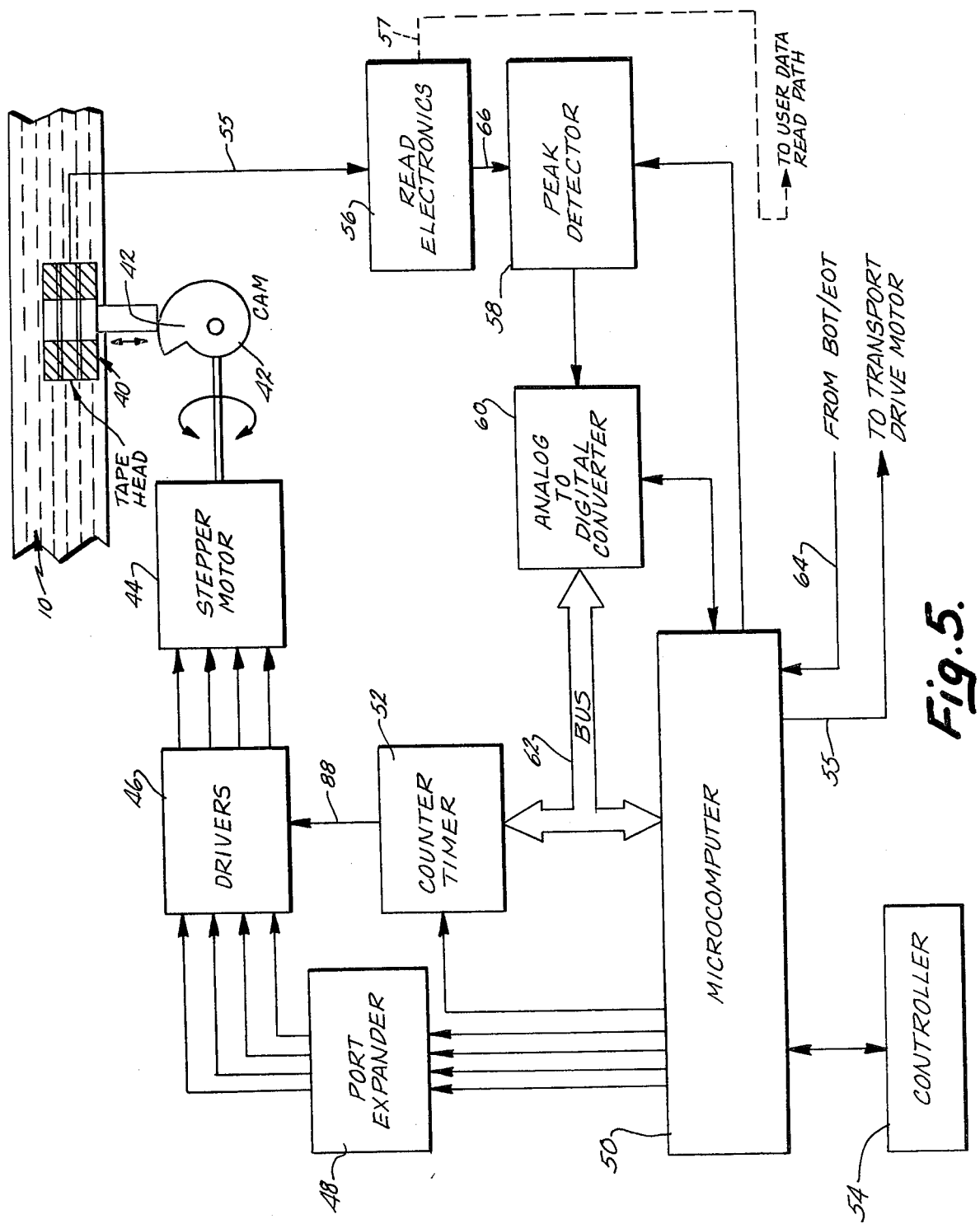
FIG. 5 is a block diagram illustrating the general system for utilizing the pre-recorded "embedded servo" positioning information provided on the record member.

A preferred, or exemplary, system for use in implementing a servo-tracking record member and track-positioning means in accordance herewith is illustrated in block schematic form in FIG. 5. Referring to that figure, it will be seen that the same depicts a closed-loop servo system in which a transducer or head 40 is mounted for cam-actuated bi-directional movement, under control of a rotary cam 42, which in turn is driven by a stepper motor 44. It should be understood that such cam and transducer are merely shown pictorially in this figure, and in the present specification, to illustrate the general character thereof. For a preferred actual apparatus and structure, reference is here made to co-pending and commonly-owned application Ser. No. 280,139, filed July 2, 1981, which to the extent necessary or desirable is to be deemed incorporated by reference herein. To depict a generally typical stepper drive environment, four different drive paths are shown leading to the stepper motor 44 from stepper drive means 46, which receives a like number of commands through a port expander 48 from a microcomputer 50, the stepper drivers 46 also receiving an input from a counter-timer 52. The microcomputer 50 embodies, or is coupled to, a controller 54, (for example, the user's data entry system controller) from which it receives commands and to which it communicates program and condition status. Microcomputer 50 also provides an output 55 directed to the tape transport or other such record drive, typically power-switching control means for an electric motor.

In its transducing operations, the head, or transducer 40 "reads" recorded transitions on the record member 10 and provides representative electrical signals through a "read electronics" circuit 56, which may for example include an operational amplifier, filter, buffer amplifier and a rectifier. The latter circuit communicates through a read channel 66 with, and is monitored by, a peak detector 58, to be commented upon in more detail subsequently, but which basically provides the sampling function indicated at points A(1), A(2), etc., shown in FIG. 4(b) and discussed above in connection therewith. From the peak detector 58, the servo loop is coupled to the microcomputer 50 and the counter-timer 52 through an analog-to-digital converter 60 and a multi-channel data bus 62, the "A/D" converter 60 serving to change the analog signals in the read channel to digital signals in the computer and controller portion of the servo loop. As indicated, the analog read electronics circuitry has an output 57 leading to the user's data read system; thus the "read electronics" 56 actually serves multiple purposes.

As additionally indicated in FIG. 5, the microcomputer 50 also receives an input 64 which, as labeled, comprises signals for the beginning-of-tape ("BOT") and end-of-tape ("EOT") sensor, which may be conventional in nature (e.g., optical) and serve to detect the holes 12a and 13a in the respective ends of the record media, where that is a tape of the type indicated in FIG. 1. Of course, other types of such end-of-record and beginning-of-record (or sector) indicia and sensing means are known, and as indicated above such a sense or indication may also be obtained from direct digital encoding on the record media itself. Whichever particular means be utilized, the resulting signal is of rather fundamental importance, at least for tape drive start and stop operations and, at least potentially, as an initial timing signal.

Figure 6:
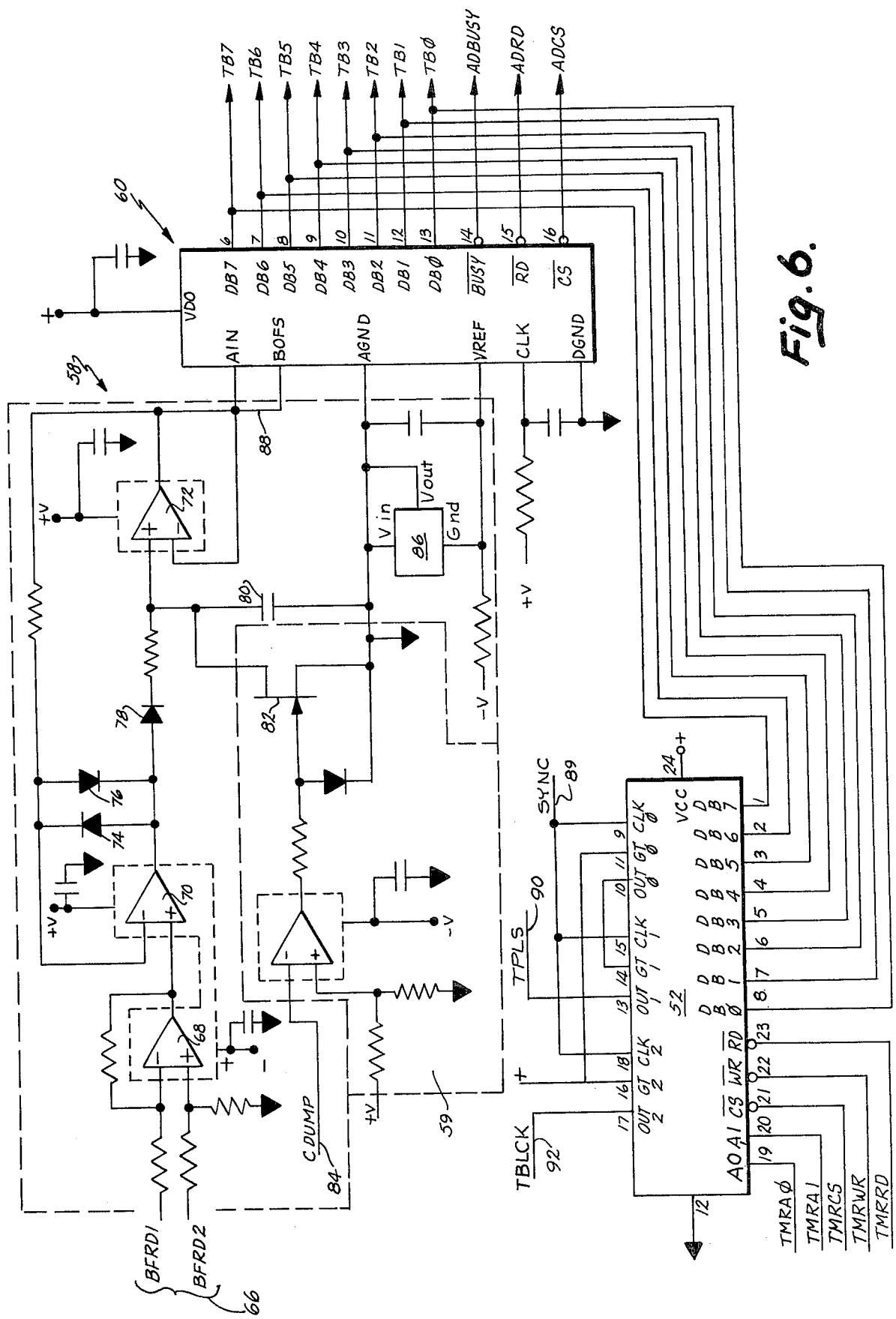
FIG. 6 is a first schematic diagram illustrating further details of a first position of the block diagram of FIG. 5.
Figure 7:
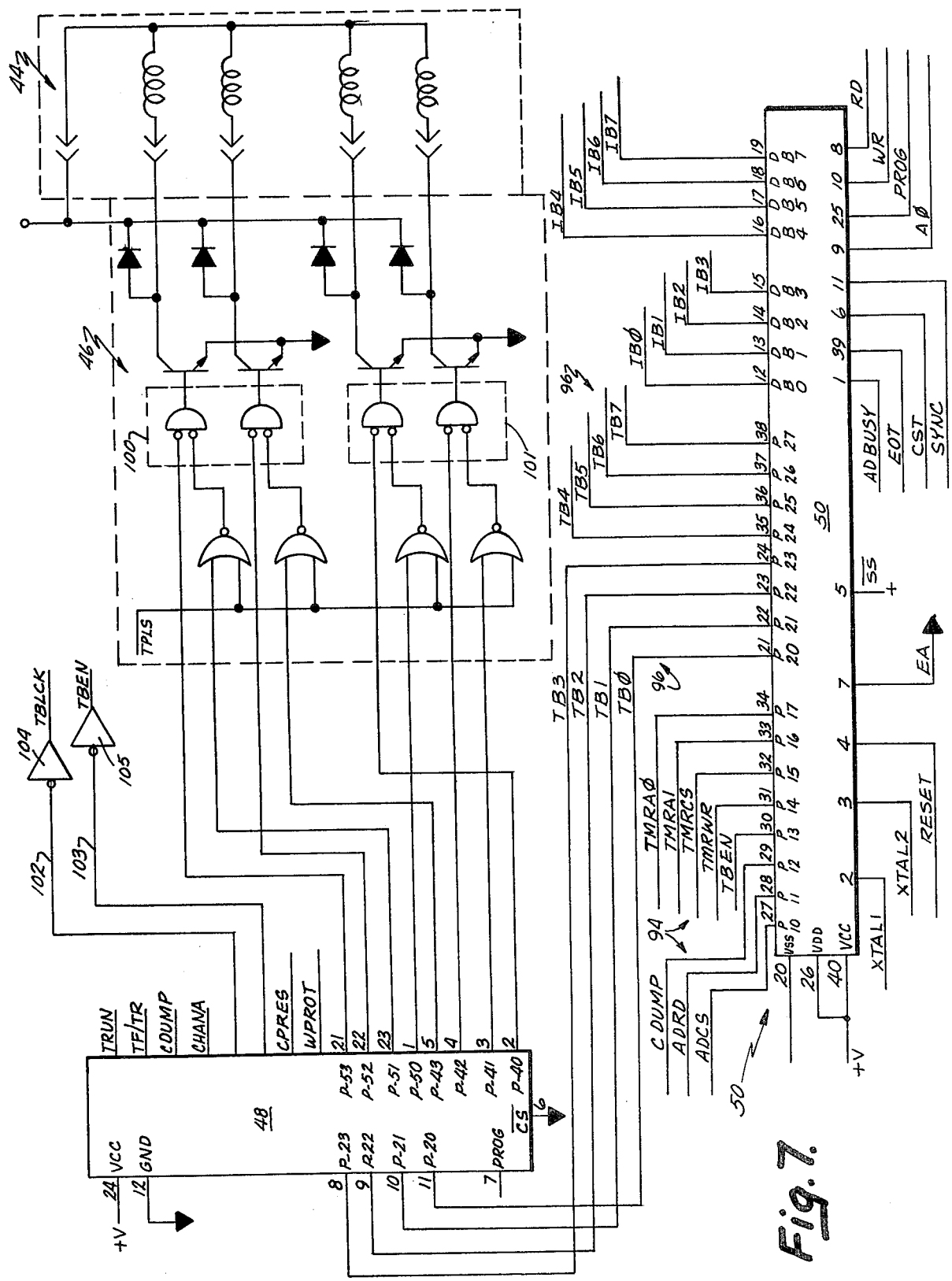
FIG. 7 is a second schematic diagram illustrating details of a second portion of the block diagram of FIG. 5.

The system shown in the FIG. 5 block diagram is illustrated in more detail in FIGS. 6 and 7, and reference is now made to all three such figures. Considering first the signals read from the recording member 10 by the transducer 40, the input channel 55 carries transduced signals to the "read electronics" 56, whose output is coupled on channel 66 to the peak detector 58, initially in the form of a two-path differential signal ("BFRD1" and "BFRD2", i.e., "buffered read 1" and "buffered read 2") (FIG. 6), which is coupled through a differential single-ended-output amplifier 68, and then to a pair of successively-coupled operational amplifiers 70 and 72, whose output is applied directly to inputs ("A in" and "B of S") of the analog-to-digital converter 60. Basically, the peak detector 58 thus commmprises the operational amplifiers 70 and 72, three diodes 74, 76 and 78, and the capacitor 80, which are coupled to the plus input of amplifier 72. Essentially, that circuitry comprises an interface for an FET switch/gate 82. The latter comprises the main portion of what may be considered a sub-unit of the peak detector, i.e, a "capacitor dump" unit, or stage, which directly controls operation of the peak-detecting capacitor 80, and thus plays an important part in the specific operation of the overall system. Control of the FET switch 82, in turn, is effected by an output 84 ("CDUMP") from the microcomputer 50 (note FIG. 7).

The output from the peak detector 58 is coupled to the analog-to-digital converter 60, as already noted in conjunction with FIG. 5. This is shown in more detail in FIG. 6, in which the A/D converter 60 may be seen to preferably comprise an integrated circuit ("IC"), which may be implemented by the commercially available IC chip designated as an AD7574JN. As illustrated in FIG. 6, one side of the peak-detecting capacitor 80 is coupled to an input of the peak-detector amplifier 72, the output of which is coupled on a circuit path 88 to the above-noted inputs of the A/D converter 60. The other side of the peak-detecting capacitor 80, to which is connected one side of a voltage-reference element 86 (which may be an IC chip AD581) is applied to a "ground" input ("AGND") of the A/D converter 60.

As already indicated, outputs from the analog-to-digital converter 60 are coupled to microcomputer 50, and also, via bus 62, to the counter-timer 52. The latter component is shown in more detail in FIG. 6, and may be implemented by an IC chip 8253. This type of counter-timer chip has a number of internal counters available as outputs, a first one of which, on port 89 ("SYNC"), is used as the frequency for a pulse-width-modulated signal which ultimately energizes the stepper motor 44, i.e., that counter signal sets the period of such pulse-width-modulated signal. A second counter output appearing on output port 90 of counter-timer 52 ("TPLS") is used to establish (i.e., modulate) the width of the pulse just mentioned, i.e., that coupled to the stepper motor. A third counter output, on port 92, provides a control signal ("TBLCK") for timing ("windowing") the occurrence and duration of anticipated recorded blocks of signals, e.g., servo positioning bursts and user data blocks.

As indicated in FIG. 6, the A/D converter 60 also interfaces (on its ports "DB$\phi$"-"DB7" inclusive) with the similarly-labelled counter-time 52 ports, and with the microcomputer 50 on its tape bus ports, i.e., ports "TB$\phi$"-"TB7" inclusive. The counter-timer 52 also communicates with the microcomputer 50 through the ports, and channels, labelled "TMRRD" (i.e., timer read), "TMRWR" (i.e., timer write), "TMRCS" (i.e., timer chip select), "TMRA" (i.e., timer address 1), and "TMRA$\beta$" (i.e., timer address Beta).

The microcomputer 50 (FIG. 7) is preferably an Intel 8041A, which is a single-chip device having one kilobyte of ROM and sixty-four bytes of RAM internally. As indicated, the microcomputer has three groups of port ends 94, 96 and 98, the first of which comprise individual controls directed variously to the peak detector, the A/D converter, the counter-timer, etc., as may be understood by the mnemonic labels attached to each such output and to the ports respectively coupled thereto. With respect to these microprocessor ports, it should be pointed out that the one labeled "TBEN" provides a tape bus, or data bus, enable signal for the bus, or port grouping, designated by the numeral 96. Other ports possibly not heretofore specifically referred to include that designated "ADRD" and that designated "ADCS", both of which couple to the similarly-labeled ports of the A/D converter 60 and provide A/D read signals and A/D chip select, respectively. The second such port grouping 96 comprises a tape bus, or more broadly, a data bus, coupled to the first eight output pins of the A/D converter 60. The third such microprocessor port grouping 98 comprises a third bus which may be considered an interprocessor channel which couples to the controller 54 (which may be a master microcomputer comprising part of an intelligent terminal or computer controlling an entire data system of which the present storage device is merely a part).

As will be understood, the port-expander 48 is in a sense merely an accessory device, which allows the addition of input/output ports for the microcomputer 50, particularly when the latter comprises the chip 8041, as indicated above. Accordingly, the port-expander may for example comprise an 8243 (Intel), which is made for that purpose. Corresponding connections between the port-expander 48 and the microcomputer 50 will be apparent from the pin designations to be found in the drawings. Port-expander outputs are also mnemonically designated, and may broadly be considered as tape (or other record member) status and motion control outputs "TRUN" providing a tape run command, "TF/TR" providing a tape forward-tape reverse command, "CHANA" providing a head channel select command, "CPRES" providing a record-present or record-in-place sensor signal, and "WPROT" providing a right-protect command (outputs such as "CDUMP", "TBLCK", and "TBEN" having already been discussed).

The stepper motor driver 46 may, as illustrated (FIG. 7), comprise discrete logic components and driver (power) transistors for energizing the coils of the stepper motor 44. Such driver circuits are, of course, well-known and often utilized, and require no particular detailed discussion. Within the driver unit generally designated 46, the two identical arrays of AND gates 100, 101 may be comprised of the commercially-available chips designated as 74LS33. As indicated previously herein, the general process or procedure of stepper motor-control known as "microstepping," by which essentially continuously-variable movement is effected, is a known technique. Insofar as the pulse-width modulation stepper motor drive approach is concerned, it will be remembered that the output designated TPLS from the second counter of the counter-timer 52 provides the pulse-width modulating command, the counter-timer being a programmable device subject to microcomputer control, such that the pulse-width actually coupled to the stepper motor is under continuous microprocessor control, the system operating in the general manner of an astable multivibrator.

In the overall operation of the system, the basic desired end is, of course, to commence motion of the tape or other record member 10 relative to the transducer head 40, move the head to and center it upon, a particular one of the various recording tracks I-VII inclusive, determine the relative position of the transducer along such track, and read or write data in the various user's data blocks 18, 18' along the particular desired recording track while continuing to read the track identification and, by monitoring the periodic servo positioning bursts, to maintain the transducer head centered upon the desired track as the tape moves along beneath (i.e., adjacent) the continuously-servo-positioned transducer head.

Initially, it is to be antipicated that, if the record member is a tape, beginning movement will typically commence with the head 10 located generally over the beginning leader portion 12, (or perhaps over the ending portion 13), in some position between the lateral edges of the tape at such location. Toward this end, the system may include any of a number of means, or measures, to position the head at a given "home" or starting position whenever the system is shut down (or loses power), or whenever it is started up again after having been shut down. For example, the stepper motor may be driven to a given location or against a stop under such conditions, thereby bringing the cam, and transducer, to a particular home position, generally aligned over a track closest to one edge, e.g., track I. Such measures are in general known and need not be particularly discussed, as is also true of techniques for moving a transducer head to a given general area of the record, or to a particular track represented by an inputted address or command.

In any event, the initial function of the system, once the tape is moving, will be to "look for" BOT/EOT signals on input 64 to the microcomputer 50. Once the appropriate such signals are received and correlated with a corresponding sync pattern in the microcomputer memory (to determine whether the tape is at the beginning or end), the next anticipated signals from the read electronics 56 will be the continuously-repeating servo burst blocks 20 from the dedicated area 14 (or 16) at the beginning (or end) of the various recorded tracks. Thus, the microcomputer will, after receiving BOT/EOT signals, initialize the system to "look for" an erased gap of duration "x", which will be detected by the absence for that particular time interval of transduced signals in read channel 66 of a magnitude greater than that set by voltage reference stage 86 as a minimal threshold for activation of the peak detector 58. That is, signals less than that threshold level, whether actually an erased gap, noise, or low-level recorded transitions of undetermined origin, will be considered as unrecorded gaps, or non-recorded areas. Transduced signals in the read channel exceeding that minimum threshold level will activate the peak detector, assuming enablement (actually, lack of disablement) by microprocessor 50 on gating input 84 of the peak detector.

More particularly, the system will require sequential detection, within the known particular time intervals, and by the peak-detector threshold technique just related, of the servo burst format shown at 20 in FIG. 3 and discussed above, including the erased gap "x" preceding a header block 32, followed by an erased gap of duration "y," followed by the two servo-positioning bursts 36 and 38, followed by a six-bit reversely-coded header 32(a) and a gap of duration "x plus y." As the transducer head is traversed by an odd-numbered track of the moving record member during the dedicated portion 14 of the record, this repeating pattern will be detected, affording an opportunity for the peak-detecting procedure discussed in conjunction with FIGS. 4(a) and 4(b), with resultant decoding of the digitally-encoded track address. Also, there will be the repetitive detecting and utilization of the servo-positioning bursts for track-following (centering) purposes.

As indicated previously, the microprocessor program should be such that so long as the correct sequence of signal types corresponding to the servo block recording format continues to be received at the correct time intervals, the detecting and track-following process continues, the decoded logic levels from the various bit cells in the header blocks being sequentially stored and, when assembled into a binary-form track address, compared with a desired track address inputted to the microprocessor by operation of the system controller 54. In general, it will be appreciated that a logical decision may then readily be computed by the microprocessor if the detected header address is not the desired one, directing the stepper driver and stepper motor 46, 44 to move the cam 42 the appropriate amount in the appropriate direction and thereby reposition the head 40 over the proper track. If it should ever happen that the head is positioned over an even-numbered track upon startup, with tape movement from left to right (or the opposite such circumstance, i.e., odd-numbered track and right-to-left movement) a "reversely-encoded" header will probably be read and the situation corrected by the microprocessor algorithm. If not, the tape would merely run its length without header decoding and stop when EOT signals were received, whereupon reverse-direction motion would resolve matters, proper header decoding, etc. taking place. During the continuously-repetitive positioning information in the dedicated areas 14 or 16, the track-identification and track-seeking process will be completed, with servo-tracking in effect when the transducer encounters the first block of user's data 18, whereupon the user may write or read data, depending upon commands inputted by the controller 54, and the transducer position will be maintained on track by the periodic embedded servo blocks.

In this procedure, it is important to note that the programmable counter-timer 52 is utilized, via the microcomputer 50, to time out the various different intervals into which the record member is formatted by its pre-recorded servo blocks 20, and also to time out the user data blocks 18, 18' between which the servo blocks are placed. That is, if signals of the appropriate level are received during the appropriate timed intervals, the detecting sequence continues; otherwise, the system is re-initialized (by command from the microcomputer to the peak detector, "dumping" the peak-detecting capacitor 80 through control of the FET switch 82).

This timing procedure is utilized to enable the read channel during particular time intervals based upon completion of the previous event; for example, following detection of the anticipated "x" erased gap and the full six bits of header, the read channel is "windowed" (i.e., enabled) at the points in time when receipt of the servo-positioning bursts 36, 38 are anticipated, and during their assigned intervals. Assuming such bursts are indeed transduced and are present in the read channel during their allocated intervals of time, and are of at least the minimum threshold value required for activation of the peak detector, the counter-timer 52 will be controlled by the mmicrocomputer to enable the read channel at the ensuing proper instant when the next significant event should occur, most particularly transducing (reading or writing) during the next area for user data, i.e., block 18'.

Thus, it should be noted that each successive different block 20 of positioning information which is detected along the length of the recording tracks on the record member must satisfy each requirement (i.e., both time location and duration, and threshold level) for erase gap, for each header bit cell, and also for both servo-positioning bursts, following which each newly-arriving block of user data is timed anew, on a continuously-updated basis, from the end of the servo block just verified, by use of the microcomputer-controlled counter-timer 52. Therefore, no separate clocking track is recorded or utilized, and no separate clock track-transducer is used in the system. In effect, each successive block of user's data is separately clocked on a continuously-updated basis, upon receipt of each new block 20 of servo information. As indicated, the system controls not only the data read channel, by which previously-recorded user data may be read out from the recording track, but also, and perhaps more importantly, controls the user's data write capability, by enabling signals outputted from the microcomputer via port expander 48, on channels 102, 103 thereof, via gates 104 and 105, respectively. One such signal is coupled to the controller 54, and the other to the write amplifier (not shown), for double blocking of any attempted writing (i.e., recording), at any time not corresponding to qualified writing periods under the microcomputer control; thus, there is a complete prohibition of the ability to record over any portion of the recording track which for any reason has not been verified by the encoded positioning signals preceding it along the track. In this manner, the pre-recorded positioning signals are positively protected from erasure, as is the user's data field immediately following that servo block. While end-to-end transport of a complete recording track without stopping is the anticipated most typical mode, the system as disclosed will also permit intermittent or incremental operations, or back up and repeat or retry operations, since transducer position upon a track will generally be maintained by the periodic embedded servo blocks during or after such activities. Transfer from one track to another is preferably performed at an end of the tape, with the head within one of the end areas of continuously-repeating servo-positioning information, and indeed continuous microprocessor program-controlled alternating left-to-right, right-to-left track-to-track operation is anticipated as one of the preferred modes, at least when the formatted record member is a tape, the tape serving as a backup storage device for the contents of a disc memory, or the like.

It is to be noted that the present system provides the advantage, in addition to those referred to above, of using only a single transducer head and associated analog electronics for reading all of the various recorded position information, including both header decoding and servo burst amplitude, and also for reading the user data. Additionally, the same analog-to-digital converter is used in the decoding of header address bytes and also in the relative measurement of the amplitude of each pair of servo bursts for positioning purposes.

It is to be understood that the foregoing description of a preferred embodiment of the invention is provided for purposes of the description and illustration, and not as a measure of the invention, whose scope is to be defined by reference to the ensuing claims. Thus, while those skilled in the art may devise embodiments of the particular concepts presented in the foregoing illustrative disclosure which differ somewhat from the particular embodiments shown and described in detail herein, or may make various changes in structural details to the illustrated embodiment, all such alternative or modified embodiments which utilize the concepts of the invention and clearly incorporate the spirit thereof are to be considered as within the scope of the claims appended herebelow, unless such claims by their language, specifically state otherwise.

The embodiments of the invention in which an exclusive property or privilege is claimed are defined as follows:

1. A servo-tracking data record member of either disk or tape form and having the capacity to record and retain signal transitions recorded thereon, and having a plurality of generally parallel recording tracks comprised at least in part by lines of pre-recorded, dedicated tracking records, said tracking records comprising a digitally-encoded header portion embodying a coded signal pattern uniquely identifying the particular recording track embodying that header, said tracking records further comprising track-centering servo signals including at least a pair of amplitude-encoded signal transitions disposed on opposite sides of each such track at a predetermined position along the recording track with respect to the said header, said recording tracks having beginning and ending regions, and at least said beginning regions comprising a plurality of said sequential, repetitive, tracking records including both said header portions and said track-centering servo signals.

2. The servo-tracking data record member of claim 1, wherein said ending regions also comprise a plurality of sequential, repeating, tracking records.

3. The servo-tracking data record member of claim 1, wherein said beginning region comprises substantially continuous repetitions of said tracking records.

4. The servo-tracking data record member of claim 1, wherein said recording tracks include repetitions of said tracking records at spaced intervals along a track between said beginning and ending regions.

5. The servo-tracking data record member of claims 1, 3 or 4, wherein said record member is in the form of recording tape.

6. The servo-tracking data record member of claim 1, wherein said digitally-encoded header portion comprises a binary-type coded track address uniquely identifying a given one track from others.

7. The servo-tracking data record member of claim 6, wherein said binary-type coded track address comprises bit cells containing recorded transitions whose duration determines the code value of the different bit cells.

8. The servo-tracking data record member of claim 7, wherein the said recorded transitions of the bit cells have a different duration than that of the said track-centering servo signals.

9. The servo-tracking data record member of claim 7, wherein said recorded transitions of said bit cells are substantially centered upon their respective recording tracks.

10. The servo-tracking data record member of claim 1, wherein the said header portions precede the servo signals along the recording track with respect to the direction of motion of the record member.

11. The servo-tracking data record member of claim 10, wherein the servo signals are located at a particular clocked interval following their respective header.

12. The servo-tracking data record member of claims 1 or 11, wherein the header portions recorded on adjacent tracks are disposed in different and non-registering lateral positions with respect to one another and are at different positions from one another along the length of their respective tracks.

13. A method of identifying a particular one of a number of generally parallel recording tracks disposed laterally adjacent one another and extending longitudinally in the direction of motion of a movable record member comprising either a disk or tape, and centering a transducer upon the identified track, said method comprising the steps of: transducing sequentially-repetitive header signals recorded along a given track of said recording member, to reproduce such signals; sampling the said reproduced signals at predetermined intervals to determine a particular signal parameter at such intervals; digitally assembling the signal parameters so determined to form a binary-type code symbol; comparing said code symbol to a reference symbol which uniquely identifies a particular recording track, to determine whether said given track from which signals have been transduced corresponds to said particular track; and, at least in significant part as a function of the said determination made by said comparing step, thereafter detecting servo-positioning signals recorded generally along said given track, and utilizing such signals to center a transducer upon said track.

14. The method as recited in claim 13, including the step of utilizing a positive comparison from said comparing step to selectively enable transducing and servo-positioning means by which said servo-positioning signals are transduced and so utilized.

15. The method as recited in claim 13, including the steps of utilizing said positive comparison to initiate a precisely-timed interval, and enabling said transducing and servo-positioning means at a particularly-timed point in said interval.

16. The method as recited in claim 15, wherein said step of enabling said transducing and servo-positioning means comprises the enabling of said means for a precisely-timed period following said particularly-timed point in said interval.

17. The method as recited in claim 16, including the steps of enabling said transducing and servo-positioning means at two separate ones of said particular points in said precisely-timed interval and accessing two different servo-positioning signal blocks recorded at correspondingly-timed different points along said recording track.

18. The method as recited in claim 14, including the step of monitoring transduced servo-positioning signals and verifying the presence of such signals by use of a required minimum amplitude as a standard, transduced record signals having an amplitude lower than said minimum being considered as non-signals in the step of servo-positioning said transducer.

19. The method as recited in claim 13, including the step of detecting the presence along said track on said record member of a particular recording characteristic appearing at the start of a recorded header, and initializing certain means used in said step of sampling said header signals as a function of such detection.

20. The method as recited in claim 19, wherein said detection of the presence of a particular recording characteristic comprises the step of detecting a substantially empty (non-record carrying) gap between recorded signals.

21. The method as recited in claim 20, wherein said step of detecting a substantially empty gap between recorded signals comprises the use of a selected minimum signal amplitude other than zero as a comparison standard, transduced signals having an amplitude less than that of said selected minimum being considered as comprising at least a portion of a substantially empty gap.

22. The method as recited in claim 19, including the step of re-initializing said means used in said step of sampling said header signals following detection of said particular recording characteristic in the event the said sampling of the transduced header signals fails to determine the presence of said particular signal parameter at certain of said predetermined particular intervals.

23. The method as recited in claim 13, including the step of using said signal samplings by assigning binary-type digital valuations to certain such signal samplings on the basis of relative signal presence at the said particularly-timed points where sampling occurs.

24. The method as recited in claim 23, including the step of assigning a first binary-type digital valuation to certain signal samplings which are determined as being present at a first such timed point but not present at a second and ensuing timed point.

25. The method as recited in claim 24, including the step of assigning a second and different binary-type digital valuation to a sampled signal which is determined as being present at both said first and said second timed points.

26. The method as recited in claim 23, including the step of using a selected minimum signal amplitude other than zero as a standard to decide whether or not said signals are relatively present at the said timed points where sampling occurs.

27. The method as recited in claim 26, wherein said detection of the presence of a particular recording characteristic comprises the step of detecting a substantially empty (non-record carrying) gap between recorded signals.

28. The method as recited in claim 27, wherein said step of detecting a substantially empty gap between recorded signals comprises the use of a selected different minimum signal amplitude other than zero and less than said selected minimum signal amplitude as a comparison standard, transduced signals having an amplitude less than that of said different selected minimum being considered as comprising at least a portion of a substantially empty gap.

29. A method of centering a transducer upon a particular recording track extending along the direction of movement of a recorded member, comprising the steps: detecting a particular record on said recording track and transducing signals from said record; using signals transduced from said particular record as a timing trigger to commence a particularly-timed interval; using an internal non-recorded clock to time the duration of said interval; using said particularly-timed interval to locate the position of recorded servo-positioning signals disposed along said recording track; and transducing said recorded servo-positioning signals and using same to center a transducer upon said track.

30. The method as recited in claim 29, including the step of identifying said particular recording track from signals recorded therealong immediately prior to commencing said particularly-timed interval.

31. The method as recited in claim 30, including the step of using certain of said recorded track-identifying signals as said timing trigger to commence said particularly-timed interval.

32. The method as recited in claim 29, including the steps of using particularly-timed points in said timed interval to separately access at least first and second mutually-distinct servo-positioning records disposed at different positions along said recording track, and sequentially transducing signals from said first and said second servo-positioning records for use in centering said transducer upon said track.

33. The method as recited in claim 32, wherein said timed points are used to time the selective enablement of a transducing "read" channel, to thereby access recorded signals along said track at particular locations.

34. The method as recited in claim 33, wherein said selected enablement of said read channel is accomplished by a selectively activating peak-detection means used to receive transduced signals.

35. A method of identifying and tracking along a particular one of a number of generally parallel recording tracks disposed side-by-side and extending lengthwise in the direction of travel of a movable record member, said method comprising the steps of seeking a track-identifying header record by transducing recorded signals located along said track, and using a predetermined signal parameter as a determinative standard to select header signals from other transduced signals; selecting transduced header signals by using as said parameter at least a predetermined minimum signal magnitude, and omitting from particular track-identifying use transduced signals having a lesser magnitude than said minimum; decoding the selected header signals to identify a given such track; transducing positioning signals recorded generally along the identified track by use of the same transducer used to transduce said header signals, and using such transduced positioning signals in a servo system to center the same said transducer upon said track.

36. A method of identifying a particular one of a number of generally parallel recording tracks disposed side-by-side and extending lengthwise in the direction of travel of a movable record member, said method comprising the steps of: seeking a track-identifying header record by using a transducer positioned in proximity to said track to reproduce recorded signals located along said track, and using a predetermined signal parameter detected in the reproduced signals as a determinative standard to designate the beginning of such a header record; said step of using a predetermined signal parameter comprising the steps of monitoring said transduced signals to detect at least one relative gap between adjacent records along said track, and operatively enabling a header-read channel coupled to said transducer as a consequence of detecting said gap, detection of said gap comprising the steps of monitoring the level of signals transduced from said record member and detecting a relative decrease in such level to a value less than a particular threshold which is greater than zero.

37. The method as recited in claim 36, including the steps of using said enabled header-read channel to transduce said header record, and using a different threshold to selectively decode a track-identifying symbol encoded in said header.

38. The method as recited in claim 36, wherein detection of said gap further comprises detecting said relative decrease in level to a value less than said particular threshold for the duration of a particular time interval.

39. A formatted, multiple-track, servo-tracking recording tape, comprising: a recording member in the form of a long, narrow tape, said member having the capability of recording and retaining recorded signal transitions; a plurality of generally parallel recording tracks extending lengthwise along said recording member; said recording tracks having tracking information recorded therealong at predetermined locations, and also having data-recording fields therealong distinct from said tracking information but disposed along the same respective track as such information; and at least certain of said recording tracks having a particular dedicated portion of their length near one end of such tracks which contains and comprises in major part repetitive tracking information embodying coded track-identifying recorded signals.

40. The recording tape as defined in claim 39, wherein said tracking information in said dedicated portions of said certain recording tracks embody recorded servo-tracking signals, said servo-tracking signals comprising signal records having characteristics indicative of the location of their respective recording tracks for use in centering a transducer upon those particular tracks.

41. The recording tape as defined in claim 39, wherein at least certain of said recording tracks include servo-tracking signals recorded generally along such tracks and located in medial areas thereof spaced lengthwise along the tape from said dedicated portions near the end of the track for use in centering a transducer upon those certain tracks.

42. The recording tape as defined in claim 41, wherein at least certain of said recording tracks having servo-tracking signals recorded therealong in medial areas of the tape also include coded track-identifying signals recorded at spaced intervals along the tape medially thereof and spaced from said dedicated end portions.

43. The recording tape as defined in claim 42, wherein said recording tracks include periodically-repeating recorded signals indicative of whether the particular location of such recorded signals is within a dedicated end portion of the tape or within a medial portion thereof.

44. The recording tape as defined in claim 39, wherein certain of said recording tracks have said particular dedicated portions containing repetitive tracking information located near both ends of such tracks.

45. The recording tape as defined in claim 39, wherein certain of said recording tracks have said particular dedicated portions containing repetitive tracking information located near at least one end of said tape and others of said recording tracks have such dedicated portions located near at least the other end of said tape, said dedicated portions located at opposite ends of the tape on different tracks comprising track-identifying start-up fields for bi-directional recording and reproducing of different tracks on the tape.

46. The recording tape as defined in claim 45, wherein said tracking information in said dedicated portions of said certain recording tracks embody recorded servo-tracking signals, said servo-tracking signals comprising signal records having characteristics indicative of the location of their respective recording tracks for use in centering a transducer upon those particular tracks.

47. The recording tape as defined in claim 45, wherein at least certain of said recording tracks include servo-tracking signals recorded generally along such tracks and located in medial areas thereof spaced lengthwise along the tape from said dedicated portions near the end of the tracks for use in centering a transducer upon those certain tracks.

48. The recording tape as defined in claim 49, wherein at least certain of said recording tracks having servo-tracking signals recorded therealong in medial areas of the tape also include coded track-identifying signals recorded at spaced intervals along the tape medially thereof and spaced from said dedicated end portions.

49. The recording tape as defined in claim 48, wherein the said track-identifying signals and the said servo-tracking signals comprising said tracking information is arranged in a first relative positioning format in said certain recording tracks and is arranged in a sequentially-reversed positioning format in said other recording tracks, to further facilitate said bi-directional recording and reproducing of different tracks on the tape.

50. The recording tape as defined in claim 49, wherein at least certain occurrences of the said coded track-identifying signals of the tracking information of said other recording tracks have such coded signals arranged in reversed sequence from the comparable sequence of the coded track-identifying signals of said certain recording tracks to provide for use of the same track-identification form in the track-identifying signals of all of said tracks while also providing for decoding during each of two mutually opposite directions of tape motion.

51. The recording tape as defined in claim 50, wherein at least certain of said recording tracks include track-identifying signal sequence occurrences encoded in accordance with forward tape motion direction and also include other track-identification signal sequence occurrences encoded in accordance with reverse tape motion direction, in order to provide for identification of such tracks regardless of the direction of tape motion.

52. A method of recording data on and reproducing such data from a particular one of a number of generally parallel recording tracks disposed side-by-side and extending length-wise in the direction of travel of a movable record member, said method comprising the steps of: seeking a track-identifying header record by using a transducer positioned in proximity to said track to reproduce recorded signals located along said track, monitoring such transduced signals to detect the presence of a particular signal condition therein, detecting such a particular signal condition, and using such detection to indicate the position along the accessed track of a recorded track-identifying header; operatively enabling header-read circuitry for a particular ensuing time interval in response to detection of said particular signal condition; monitoring signals from said header-read circuitry during said time interval and logically evaluating signals accessed during said interval to verify conformance of such signals to a known header signal pattern; using a verified header signal pattern to initiate a second timed interval and during said second timed interval detecting servo-tracking signals recorded along said track; and using the detection of said servo-tracking signals during said second timed interval to initiate a third timed interval for data-signal recording or reproduction along said track during such third timed interval.

53. The method as recited in claim 52, including the steps of timing each of said time intervals by using an internal non-recorded clock source.

54. The method as recited in claim 53, including the steps of selectively accessing said internal clock to time said intervals in response to particular transduced signal conditions.

55. The method as recited in claim 54, including the steps of separately timing the interval of each of a plurality of separate fields of said data signals by separately accessing said internal clock prior to each such different data field interval.

56. The method as recited in claim 55, including the step of separately timing said plurality of data fields by separate detection and verification of a separate recorded track address header located ahead of each such different data field along said track.

57. The method as recited in claim 56, wherein said method is characterized by using only the same transducer for reproducing said header and said data fields, and selectively using said internal clock in response to the content of signals reproduced by said transducer.

58. A method of identifying and determining the instantaneous position of a transducer with respect to the length of a particular one of a number of generally parallel recording tracks disposed side-by-side and extending length-wise in the direction of travel of a movable record member, said method comprising the steps of: seeking a track-identifying header record disposed at a plurality of spaced intervals along each of said tracks by using a transducer positioned in proximity to said track to reproduce any recorded signals located along said track, using a predetermined signal parameter detected in the reproduced signals as a determinative standard to designate the beginning of such a header record; decoding a track address encoded in said header; and decoding a station address signal recorded proximate to said header and indicative of the location along said track of said station address recording, thereby indicating the position of the transducer with respect to the length of the track at the time such signal was transduced.

* * * * *

UNITED STATES PATENT AND TRADEMARK OFFICE
CERTIFICATE OF CORRECTION

PATENT NO. : 4,472,750

DATED : September 18, 1984

INVENTOR(S) : Marlin K. Klumpp et al

It is certified that error appears in the above-identified patent and that said Letters Patent is hereby corrected as shown below:

Column 12, line 22:
  "commprises" should be --comprises--

Column 13, line 3:
  "counter-time" should be --counter-timer--

Column 14, line 55:
  "recorded" should be --record--

Column 16, line 13:
  "mmicrocomputer" should be --microcomputer--

Column 18, claim 12, line 19:
  "11" should be --10--

Column 22, claim 48, line 26:
  "49" should be --47--

Signed and Sealed this

Second Day of July 1985

[SEAL]

Attest:

DONALD J. QUIGG

Attesting Officer     Acting Commissioner of Patents and Trademarks